United States Patent
Alba et al.

(10) Patent No.: US 10,255,271 B2
(45) Date of Patent: Apr. 9, 2019

(54) DISAMBIGUATION OF THE MEANING OF TERMS BASED ON CONTEXT PATTERN DETECTION

(71) Applicant: International Business Machines Corporation, Armonk, NY (US)

(72) Inventors: Alfredo Alba, Morgan Hill, CA (US); Clemens Drews, San Jose, CA (US); Daniel F. Gruhl, San Jose, CA (US); Linda H. Kato, San Jose, CA (US); Christian B. Kau, Los Altos, CA (US); Neal R. Lewis, San Jose, CA (US); Pablo N. Mendes, San Francisco, CA (US); Meenakshi Nagarajan, San Jose, CA (US); Cartic Ramakrishnan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 237 days.

(21) Appl. No.: 15/425,751

(22) Filed: Feb. 6, 2017

(65) Prior Publication Data
US 2018/0225278 A1 Aug. 9, 2018

(51) Int. Cl.
*G06F 17/27* (2006.01)

(52) U.S. Cl.
CPC ........ *G06F 17/2785* (2013.01); *G06F 17/277* (2013.01)

(58) Field of Classification Search
CPC ............................ G06F 17/2785; G06F 17/277
USPC ............................................................ 704/9
See application file for complete search history.

(56) References Cited

U.S. PATENT DOCUMENTS

| | | | |
|---|---|---|---|
| 5,243,520 A | 9/1993 | Jacobs et al. | |
| 6,126,306 A | * 10/2000 | Ando | G06F 17/2735 708/605 |
| 6,366,908 B1 | * 4/2002 | Chong | G06F 17/30616 |

(Continued)

OTHER PUBLICATIONS

Alba et al., "Symbiotic Cognitive Computing through Iteratively Supervised Lexicon Induction," The Workshops of the Thirtieth AAAI Conference on Artificial Intelligence Symbiotic Cognitive Systems: Technical Report WS-16-14, 2016, pp. 719-723.

(Continued)

*Primary Examiner* — Edwin S Leland, III
(74) *Attorney, Agent, or Firm* — Robert A. Voigt, Jr.; Winstead, P.C.

(57) ABSTRACT

A method, system and computer program product for disambiguating meaning of terms. A natural language processing system obtains a first corpora of words used in a first sense and a second corpora of the same words that are used in a second sense. Each of these corpora of words may be associated with different linguistic domains. The natural language processing system generates a first and a second set of patterns using both the first and second corpora of words, respectively. A question passage is then received by the natural language processing system. The natural language processing system examines a word of interest in the question passage. The user is then notified that the word of interest is being used in the first sense or the second sense in response to identifying the word of interest in only the first set of patterns or the second set of patterns, respectively.

18 Claims, 3 Drawing Sheets

(56) References Cited

U.S. PATENT DOCUMENTS

| | | | | |
|---|---|---|---|---|
| 6,629,087 | B1* | 9/2003 | Benson | G06F 17/24 704/2 |
| 6,947,918 | B2 | 9/2005 | Brill | |
| 7,546,235 | B2* | 6/2009 | Brockett | G06F 17/2785 704/1 |
| 7,552,046 | B2* | 6/2009 | Brockett | G06F 17/27 704/1 |
| 7,584,092 | B2* | 9/2009 | Brockett | G06F 17/27 704/1 |
| 7,590,628 | B2* | 9/2009 | Zhao | G06F 17/3071 |
| 7,672,833 | B2 | 3/2010 | Blume et al. | |
| 8,224,839 | B2* | 7/2012 | Krupka | G06F 17/30672 707/765 |
| 8,499,008 | B2* | 7/2013 | Pennacchiotti | G06N 99/005 707/803 |
| 8,594,996 | B2 | 11/2013 | Liang et al. | |
| 8,712,759 | B2 | 4/2014 | Ylonen | |
| 8,713,515 | B1* | 4/2014 | Biggerstaff | G06F 8/72 717/104 |
| 8,812,435 | B1* | 8/2014 | Zhao | G06F 17/30867 706/45 |
| 8,812,509 | B1* | 8/2014 | Pasca | G06F 17/30634 707/732 |
| 8,825,471 | B2* | 9/2014 | Betz | G06F 17/30864 704/1 |
| 9,020,805 | B2 | 4/2015 | Boguraev et al. | |
| 9,043,197 | B1* | 5/2015 | Pasca | G06F 17/30654 704/10 |
| 9,098,492 | B2* | 8/2015 | Tunstall-Pedoe | G06F 17/30654 |
| 9,110,882 | B2* | 8/2015 | Overell | G06F 17/278 |
| 9,229,800 | B2* | 1/2016 | Jain | G06Q 30/01 |
| 9,330,175 | B2* | 5/2016 | Bobick | G06F 17/30731 |
| 9,330,359 | B2* | 5/2016 | Li | G06F 17/30964 |
| 9,519,681 | B2* | 12/2016 | Tunstall-Pedoe | G06N 5/02 |
| 10,019,995 | B1* | 7/2018 | Abramovitz | G10L 17/06 |
| 10,101,822 | B2* | 10/2018 | Hatori | G06F 3/0237 |
| 2004/0039564 | A1* | 2/2004 | Mueller | G06F 17/2785 704/9 |
| 2004/0111479 | A1* | 6/2004 | Borden | G06Q 10/107 709/206 |
| 2005/0033569 | A1* | 2/2005 | Yu | G06F 17/276 704/10 |
| 2006/0235843 | A1* | 10/2006 | Musgrove | G06F 17/30616 |
| 2015/0066477 | A1* | 3/2015 | Hu | G06F 17/2785 704/9 |
| 2015/0149461 | A1* | 5/2015 | Aguilar Lemarroy | G06F 17/30705 707/737 |
| 2015/0279366 | A1* | 10/2015 | Krestnikov | H04W 4/70 704/235 |
| 2017/0004184 | A1* | 1/2017 | Jain | G06F 17/2735 |
| 2017/0031893 | A1* | 2/2017 | Ball | G06F 17/2705 |
| 2017/0242846 | A1* | 8/2017 | Zelenkov | G06F 17/271 |
| 2018/0060302 | A1* | 3/2018 | Liang | G06F 17/277 |
| 2018/0225258 | A1* | 8/2018 | Alba | G06F 17/24 |
| 2018/0225278 | A1* | 8/2018 | Alba | G06F 17/2785 |

OTHER PUBLICATIONS

Li et al., "Mining Evidences for Named Entity Disambiguation," KDD'13, Chicago, Illinois, USA, Aug. 11-14, 2013, pp. 1-9.

Corro et al., "FINET: Context-Aware Fine-Grained Named Entity Typing," Proceedings of the 2015 Conference on Empirical Methods in Natural Language Processing, Lisbon, Portugal, Sep. 17-21, 2015, pp. 868-878.

He et al., "Learning Entity Representation for Entity Disambiguation," Proceedings of the 51st Annual Meeting of the Association for Computational Linguistics, Sofia, Bulgaria, Aug. 4-9, 2013, pp. 30-34.

Pilehvar et al., "From Senses to Texts: An All-in-One Graph-Based Approach for Measuring Semantic Similarity," Artificial Intelligence, vol. 228, 2015, pp. 95-128.

Nenadic et al., "Automatic Discovery of Term Similarities Using Pattern Mining," Coling-02 on Computerm '02, Second International Workshop on Computational Terminology, vol. 14, 2002, pp. 1-7.

Strapparava et al., "Pattern Abstraction and Term Similarity for Word Sense Disambiguation: IRST at Senseval-3," Third International Workshop on the Evaluation of Systems for the Semantic Analysis of Text, Barcelona, Spain, Jul. 2004, pp. 1-6.

* cited by examiner

DISAMBIGUATION OF THE MEANING OF TERMS BASED ON CONTEXT PATTERN DETECTION

TECHNICAL FIELD

The present invention relates generally to natural language processing systems, and more particularly to disambiguation of the meaning of terms based on context pattern detection.

BACKGROUND

Various techniques are currently being utilized to understand written human language, such as natural language processing. Natural language processing is a field of computer science, artificial intelligence and computation linguistics concerned with the interactions between computers and human (natural) languages. As such, natural language processing involves natural language understanding enabling computers to derive meaning from human or natural language input.

However, understanding written human language across various linguistic domains is an increasing challenge. A "linguistic domain," as used herein, refers to a sphere of knowledge. For example, an ambiguous phrase may have different meanings based on the context of the use of the phrase. For instance, a natural language processing system may understand terms used in the linguistic domain of animals, but when the system is expanded to process terms used in the linguistic domain of car brands, the natural language processing system may not be able to distinguish the term "Pinto" from referring to a horse or a car.

Disambiguating the meaning of terms with multiple meanings is important in various areas, including business and academic applications. For example, in the context of a business application used for drug safety, it is important to distinguish between when a mentioned concept refers to a risk as opposed to a precondition. The inability to make clear distinctions can degrade efficiency in the process of obtaining approval to market a drug by the U.S. Food and Drug Administration as well as increase cost by requiring human involvement.

In another example where it is important to disambiguate the meaning of terms by attributing the correct meaning to the term in question (accurately assigning the role to the term), accurate role assignment is important in social media extraction. For example, knowing the sense of a noun is important to track the sentiment. For instance, if a social media post uses the term "BP," the term "BP" may refer to the oil and gas company British Petroleum or to a birthday party. In order to correctly track sentiment, it is important to attribute the correct meaning to the term.

By disambiguating the meaning of terms with multiple meanings, the utilization of applications, such as business and academic applications, is improved by reducing misclassification and increasing the confidence in decision making.

Unfortunately, there is not currently a language independent example drive means for effectively disambiguating the meaning of terms with multiple meanings.

SUMMARY

In one embodiment of the present invention, a method for disambiguating meaning of terms comprises obtaining a first corpora of words used in a first sense. The method further comprises obtaining a second corpora of words used in a second sense. The method additionally comprises generating, by a processor, a first set of patterns and a second set of patterns using the first corpora of words and the second corpora of words, respectively. Furthermore, the method comprises receiving a question passage. Additionally, the method comprises examining, by the processor, a word of interest in the question passage. In addition, the method comprises notifying, by the processor, a user that the word of interest is being used in the first sense or the second sense in response to identifying the word of interest in only the first set of patterns or the second set of patterns, respectively.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
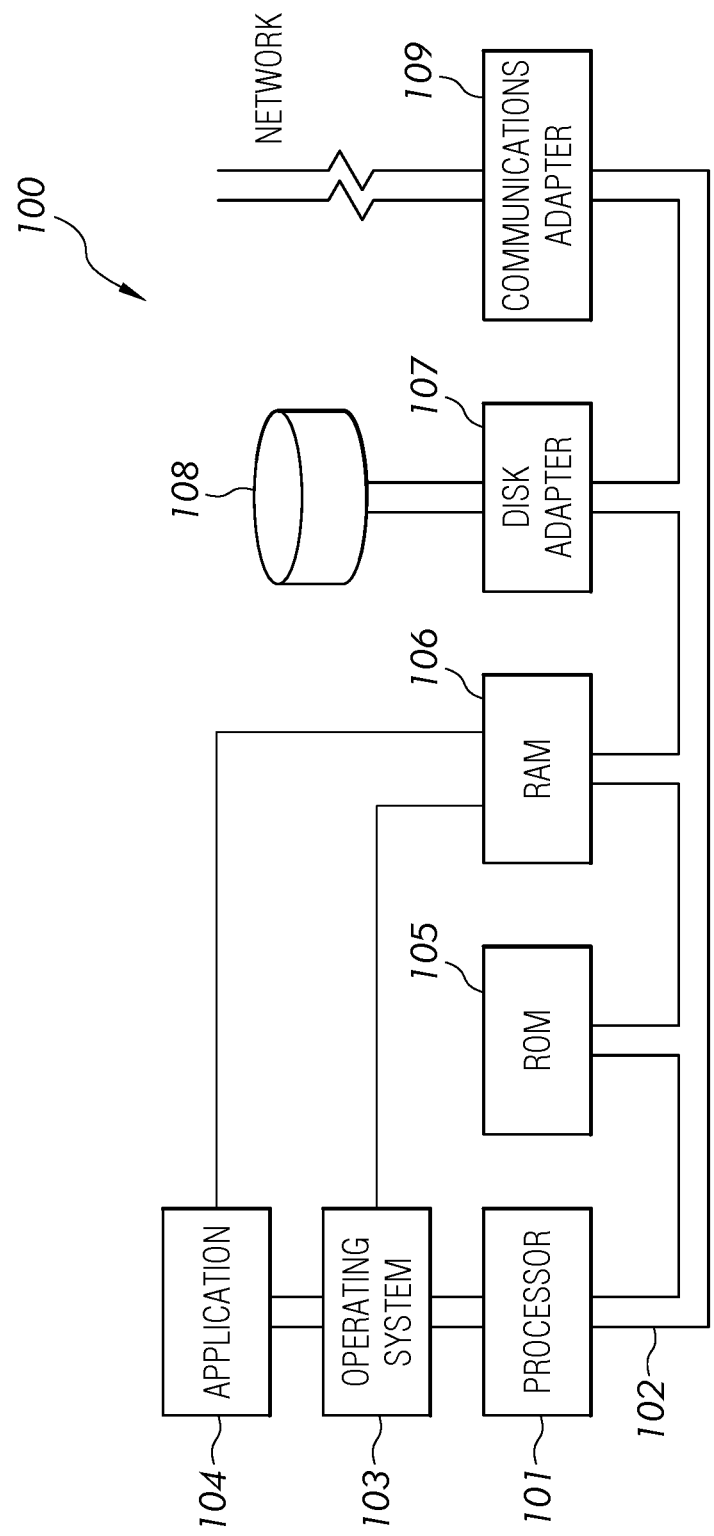
FIG. 1 illustrates a hardware configuration of a natural language processing system in accordance with an embodiment of the present invention.

The present invention comprises a method, system and computer program product for disambiguating the meaning of terms. In one embodiment of the present invention, a natural language processing system obtains a first corpora of words used in a first sense and a second corpora of the same words that are used in a second sense. Each of these corpora of words may be associated with different linguistic domains (e.g., domain of animals and domain of sports). The natural language processing system generates a first and second set of patterns using both the first and second corpora of words, respectively. These "patterns," as used herein, refer to context patterns that contain words, phrases, a sentence, etc. containing a term with multiple meanings used in a specific sense. For example, if the first corpora of words is associated with the linguistic domain of animals, then the set of patterns generated for the linguistic domain of animals contains patterns (words, phrases, a sentence, etc.) containing a term (e.g., bat) with multiple meanings used in the sense (e.g., mammal) associated with the linguistic domain of animals. In another example, if the second corpora of words is associated with the linguistic domain of sports, then the set of patterns generated for the linguistic domain of sports contains patterns (words, phrases, a sentence, etc.) containing a term (e.g., bat) with multiple meanings used in the sense (e.g., club used to strike a ball) associated with the linguistic domain of sports. A question passage is then received by the natural language processing system. A "question passage," as used herein, refers to a sequence of two or more words arranged in a grammatical construction, where one of the words includes a term that has multiple meanings. The natural language processing system examines a word of interest in the question passage. A "word of interest," as used herein, refers to a term that has different meanings based on the context of the use of such a term. The user is then notified that the word of interest is being used in the first sense or the second sense in response to identifying the word of interest in only the first set of patterns or the second set of patterns, respectively. In this manner, the meaning of terms with multiple meanings can be effectively disambiguated based on context pattern detection thereby improving the utilization of applications, such as business and academic applications, such as by reducing misclassification and increasing the confidence in decision making. Furthermore, in this manner, the present invention provides a language independent example driven means for effectively disambiguating the meaning of terms with multiple meanings.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a hardware configuration of a natural language processing system 100 which is representative of a hardware environment for practicing the present invention. Natural language processing system 100 is configured to disambiguate terms of interest which have multiple meanings as discussed further below. Natural language processing system 100 may include a computer cluster (set of loosely or tightly connected computers that work together so that, in many respects, they can be viewed as a single system) or a single computing system as shown in FIG. 1.

Referring to FIG. 1, natural language processing system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for disambiguating the meaning of terms based on context pattern detection as discussed further below in connection with FIGS. 2-3.

Referring again to FIG. 1, read-only memory ("ROM") 105 is coupled to system bus 102 and includes a basic input/output system ("BIOS") that controls certain basic functions of natural language processing system 100. Random access memory ("RAM") 106 and disk adapter 107 are also coupled to system bus 102. It should be noted that software components including operating system 103 and application 104 may be loaded into RAM 106, which may be natural language processing system's 100 main memory for execution. Disk adapter 107 may be an integrated drive electronics ("IDE") adapter that communicates with a disk unit 108, e.g., disk drive. It is noted that the program for disambiguating the meaning of terms based on context pattern detection, as discussed further below in connection with FIGS. 2-3, may reside in disk unit 108 or in application 104.

Natural language processing system 100 may further include a communications adapter 109 coupled to bus 102. Communications adapter 109 interconnects bus 102 with an outside network thereby enabling natural language processing system 100 to communicate with other systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, understanding written human language across various linguistic domains is an increasing challenge. A "linguistic domain," as used herein, refers to a sphere of knowledge. For example, an ambiguous phrase may have different meanings based on the context of the use of the phrase. For instance, a natural language processing system may understand terms used in the linguistic domain of animals, but when the system is expanded to process terms used in the linguistic domain of car brands, the natural language processing system may not be able to distinguish the term "Pinto" from referring to a horse or a car. Disambiguating the meaning of terms with multiple meanings is important in various areas, including business and academic applications. By disambiguating the meaning of terms with multiple meanings, the utilization of applications, such as business and academic applications, is improved by reducing misclassification and increasing the confidence in decision making. Unfortunately, there is not currently a means for effectively disambiguating the meaning of terms with multiple meanings.

Figure 2:
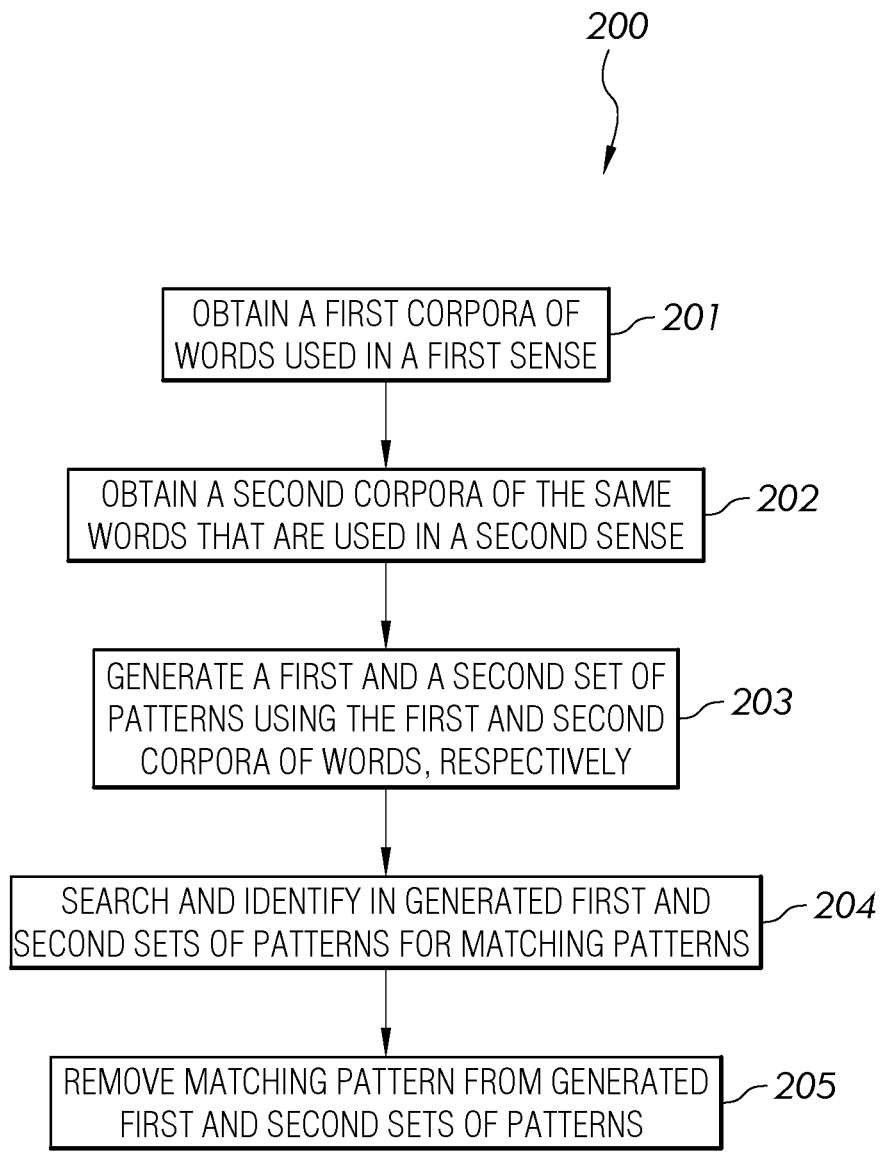
FIG. 2 is a flowchart of a method for generating sets of patterns using corpora of words used in different senses in accordance with an embodiment of the present invention.
Figure 3:
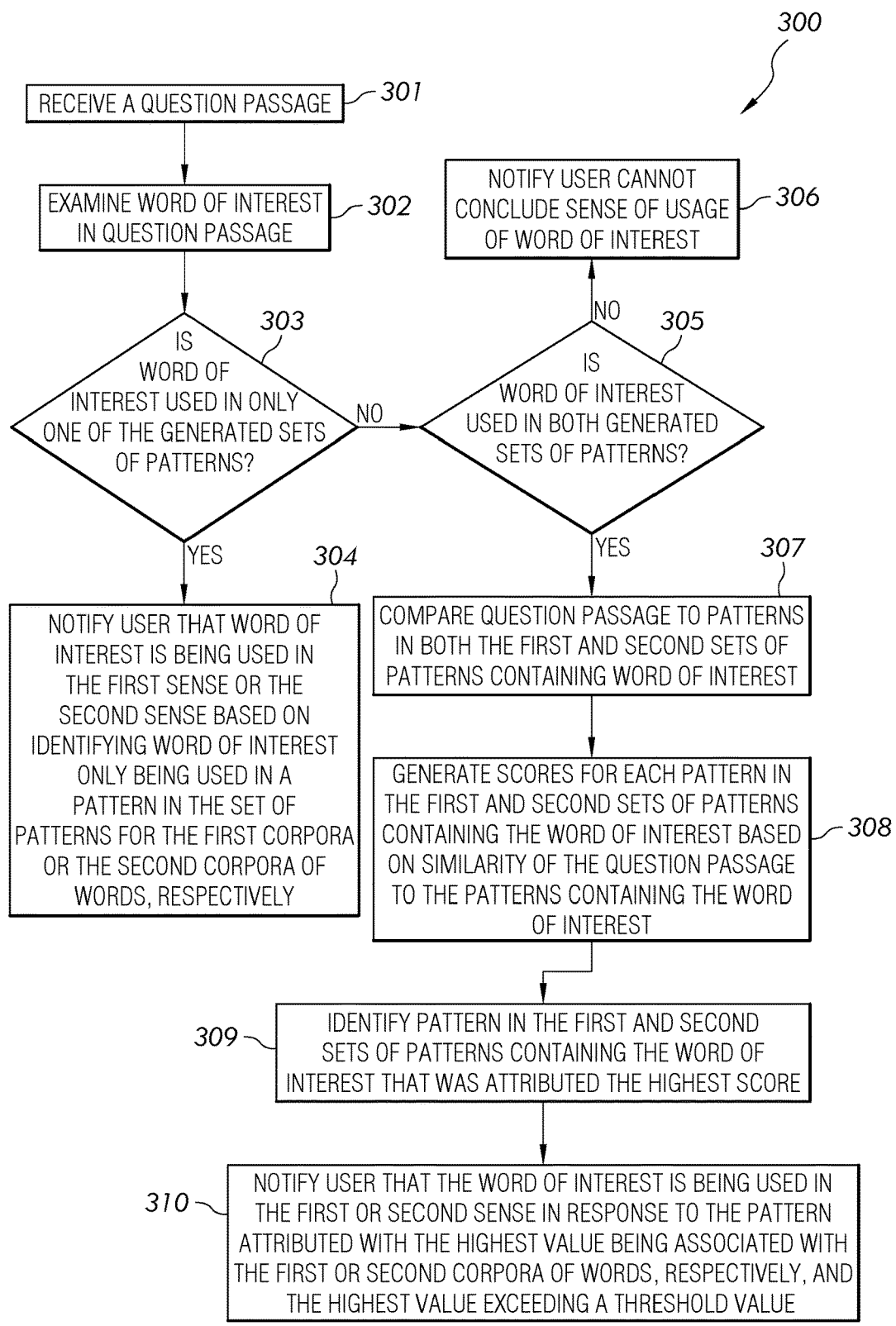
FIG. 3 is a flowchart for disambiguating the meaning of terms with multiple meanings based on context pattern detection in accordance with an embodiment of the present invention.

The principles of the present invention provide a means for effectively disambiguating the meaning of terms with multiple meanings based on context pattern detection as discussed below in association with FIGS. 2-3. FIG. 2 is a flowchart of a method for generating sets of patterns using corpora of words used in different senses. FIG. 3 is a flowchart of a method for disambiguating the meaning of terms with multiple meanings based on context pattern detection.

As stated above, FIG. 2 is a flowchart of a method 200 for generating sets of patterns using corpora of words used in different senses in accordance with an embodiment of the present invention.

Referring to FIG. 2, in conjunction with FIG. 1, in step 201, natural language processing system 100 obtains a first corpora of words used in a first sense. In one embodiment, such a corpora of words is inputted to natural language processing system 100 by a user (e.g., linguistic expert) of natural language processing system 100.

In step 202, natural language processing system 100 obtains a second corpora of the same words that are used in a second sense. In one embodiment, such a corpora of words is inputted to natural language processing system 100 by a user of natural language processing system 100. In one embodiment, the first and second corpora are associated with different linguistic domains.

For example, the term "bat" may refer to a mammal or a club used in certain games, such as baseball and cricket, to strike the ball. The term bat may be contained in the first corpora of words associated with the linguistic domain of animals as well as contained in the second corpora of words associated with the linguistic domain of sports.

In step 203, natural language processing system 100 generates a first and a second set of patterns using the first and second corpora of words, respectively. These "patterns," as used herein, refer to context patterns that contain words, phrases, a sentence, etc. containing a term with multiple meanings used in a specific sense. For example, if the first corpora of words is associated with the linguistic domain of animals, then the set of patterns generated for the linguistic domain of animals contains patterns (words, phrases, a sentence, etc.) containing a term (e.g., bat) with multiple meanings used in the sense (e.g., mammal) associated with the linguistic domain of animals. In another example, if the second corpora of words is associated with the linguistic domain of sports, then the set of patterns generated for the linguistic domain of sports contains patterns (words, phrases, a sentence, etc.) containing a term (e.g., bat) with multiple meanings used in the sense (e.g., club used to strike a ball) associated with the linguistic domain of sports.

In one embodiment, the sets of patterns are generated using an iteratively supervised lexicon induction algorithm. In such an approach, a domain (linguistic domain) expert builds a simplified domain model (e.g., semantic lexicons) and annotates documents with that model. In one embodiment, natural language processing system 100 reviews documents and extracts patterns containing words used in the domain model, such as the words from the first and second corpora of words. A "document," as used herein, refers to any electronic writing conveying information, such as a social media post, a word processing document, an electronic message, etc. Natural language processing system 100 attempts to categorize these patterns in the appropriate linguistic domain based on the contextual meaning of the pattern. Through feedback from the user, system 100 adapts more quickly and produces more accurate results. Such a cycle is used to generate and assign high quality patterns to the appropriate domain.

In step 204, natural language processing system 100 searches and identifies in the generated sets of patterns for matching patterns. That is, natural language processing system 100 searches and identifies in the first and second sets of patterns that used the first and second corpora of words, respectively, for matching patterns. For example, the pattern "I bought a Pinto" may be in the first set of patterns using the first corpora of words associated with the linguistic domain of animals as well as in the second set of patterns using the second corpora of words associated with the linguistic domain of car brands. Such a matching pattern is identified and removed from each set of patterns as discussed below.

In step 205, natural language processing system 100 removes the matching pattern from the generated first and second sets of patterns. The matching pattern is removed from the generated sets of patterns since it will not be able to assist in disambiguating the meaning of a term (e.g., "Pinto") in that matching pattern ("I bought a Pinto").

Once the contextual patterns are generated, the disambiguation of the meaning of a term can be determined using these contextual patterns or signatures as discussed below in connection with FIG. 3.

As stated above, FIG. 3 is a flowchart of a method 300 for disambiguating the meaning of terms with multiple meanings based on context pattern detection in accordance with an embodiment of the present invention.

Referring to FIG. 3, in conjunction with FIGS. 1-2, in step 301, natural language processing system 100 receives a "question passage." A "question passage," as used herein, refers to a sequence of two or more words arranged in a grammatical construction, where one of the words includes a term that has multiple meanings. In one embodiment, such a question passage is identified by natural language processing system 100 in a document provided to natural language processing system 100 based on a term of interest being used in multiple domains (or corpora of words). A "document," as used herein, refers to any electronic writing conveying information, such as a social media post, a word processing document, an electronic message, etc.

In step 302, natural language processing system 100 examines a word of interest in the question passage. A "word of interest," as used herein, refers to a term that has different meanings based on the context of the use of such a term. In one embodiment, natural language processing system 100 identifies the word of interest based on a learning algorithm which is initially provided words with multiple meanings from a linguistic expert and then learns further words with multiple meanings based on further exposure of patterns utilizing terms with different meanings across different linguistic domains. Such exposure may be learned by scanning and reviewing text in documents with topics covering different linguistic domains.

In step 303, a determination is made by natural language processing system 100 as to whether the word of interest is used in only one of the generated sets of patterns (the generated first and second sets of patterns of step 203). For example, suppose that the word of interest is "bark" which has multiple meanings. A determination is then made as to whether the term "bark" is used in one of the generated patterns.

If the word of interest is used in only one of the generated sets of patterns, then, in step 304, natural language processing system 100 notifies the user (e.g., user of natural language processing system 100) that the word of interest is being used in the first sense or the second sense based on identifying the word of interest only being used in a pattern in the set of patterns for the first corpora or the second corpora of words, respectively. For example, suppose that the first set of patterns using the first corpora of words is associated with the linguistic domain of sounds of animals and the second set of patterns using the second corpora of words is associated with the linguistic domain of sports teams, then the term "bark" may be found in a pattern "the dog barked at me" associated with the linguistic domain of sounds of animals and may not be found in any patterns associated with the linguistic domain of sports teams.

If, however, the word of interest was not used in only one of the generated sets of patterns, then, in step 305, a determination is made by natural language processing system 100 as to whether the word of interest is used in both generated sets of patterns (the generated first and second sets of patterns of step 203).

If the word of interest is not used in any of the generated sets of patterns, then, in step 306, natural language processing system 100 notifies the user (e.g., user of natural language processing system 100) that it cannot conclude the sense of the usage of the word of interest.

If, however, the word of interest is used in both generated sets of patterns, then, in step 307, natural language processing system 100 compares the question passage to patterns in both the first and second generated sets of patterns containing the word of interest. For example, if the question passage is "Cabrera loses bat in the stands, Tigers fan gives it back," and the word of interest is "bat," then the question passage is compared with the patterns in both the first and second sets of patterns containing the word of interest.

In step 308, natural language processing system 100 generates scores (meaning ranking scores) for each pattern in the first and second generated sets of patterns containing the word of interest based on the similarity of the question passage to the patterns containing the word of interest. In one embodiment, such a score is generated by natural language processing system 100 using natural language processing to assess the similarity of terms used in the question passage with respect to the terms used in the pattern containing the same word of interest. In one embodiment, the higher the similarity of terms, the higher the score. In one embodiment, the similarity of the question passage with respect to the patterns containing the word of interest is based on the use of the same or similar term (including different tenses of the same or similar term). In one embodiment, the similarity of the question passage with respect to the patterns containing the word of interest is based on semantic similarity. For example, the term "AI" and "artificial intelligence" may be deemed to be strongly correlated and similar since the term "AI" is usually abbreviated for artificial intelligence. In one embodiment, the similarity of the question passage with respect to the patterns containing the word of interest is based on semantic context. In such an embodiment, natural language processing system 100 may examine documents that contain snippets of text to discover other contextual terms to help provide a greater context for the question passage and generated patterns. A context vector may be generated that contains many words that tend to occur in context with certain term(s). Such context vectors may be utilized to assess the degree of similarity between the question passage and the patterns in the generated sets of patterns containing the word of interest.

In step 309, natural language processing system 100 identifies the pattern in the first and second generated sets of patterns containing the word of interest that was attributed the highest score.

In step 310, natural language processing system 100 notifies the user (e.g., user of natural language processing system 100) that the word of interest is being used in the first or second sense in response to the pattern with the highest value being associated with the first or second corpora of words, respectively, and the highest value exceeding a threshold value, which may be user selected.

For example, suppose that the question passage is "Cabrera loses bat in the stands, Tigers fan gives it back," and that the generated first set of patterns uses the first corpora of words associated with the linguistic domain of animals and that the generated second set of patterns uses the second corpora of words associated with the linguistic domain of baseball. Furthermore, suppose that the word of interest was the term "bat" which has multiple meanings and is found in a pattern in both generated sets of patterns. A score may be generated for each pattern in these sets of patterns that contain the word of interest "bat" based on the degree of similarity between the question passage and the pattern containing the word of interest "bat." For example, a pattern, such as "Miguel Cabrera hits another walk-off home run for the Tigers, tossing his bat in delight," in the second set of patterns using the second corpora of words associated with the linguistic domain of baseball would receive a higher score than the pattern, such as "bats flap their wings and fly like a bird," in the first set of patterns using the first corpora of words associated with the linguistic domain of animals, since the question pattern is more similar to the former pattern than the latter pattern in terms of the usage of similar words ("Tigers" and "Cabrera") and semantics. As a result, if the score associated with the former pattern exceeds a threshold, then it may be inferred that the word of interest "bat" is being used in the sense associated with the game of baseball. That is, it may be inferred that the word of interest "bat" as used in the question passage is likely to have the meaning of a club that is used in baseball to strike the ball.

In one embodiment, if the highest score attributed to the pattern containing the word of interest does not exceed the threshold value, then natural language processing system 100 notifies the user (e.g., user of natural language processing system 100) that it cannot conclude the sense of the usage of the word of interest, such as in step 306.

In this manner, the meaning of terms with multiple meanings can be disambiguated based on context pattern detection thereby improving the utilization of applications, such as business and academic applications, such as by reducing misclassification and increasing the confidence in decision making. Furthermore, in this manner, the present invention provides a language independent example driven means for effectively disambiguating the meaning of terms with multiple meanings.

While the foregoing discusses the present invention in connection with using two corpora of the same words used in different sense, the principles of the present invention may be applied to using more than two corpora of the same words used in different sense. Furthermore, the principles of the present invention may generate greater than two sets of patterns using more than two corpora of the same words used in different senses. Additionally, the principles of the present invention may disambiguate the meaning of terms with multiple meanings based on context pattern detection utilizing more than two sets of patterns. For example, the present invention may compare the question passage to patterns in more than two sets of patterns containing the word of interest in the case where the word of interest in the question passage was used in more than two different sets of patterns associated with more than two different linguistic domains. In the situation involving the word of interest being used in more than two different sets of patterns associated with more than two different linguistic domains, the word of interest is attributed the sense (meaning) based on which pattern in one of the generated sets of patterns is attributed the highest score (and assuming that the score exceeds the threshold value). The word of interest would then be deemed to be used in the sense that is utilized for that linguistic domain (the linguistic domain associated with the pattern that is attributed the highest score).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for disambiguating meaning of terms, the method comprising:
   obtaining a first corpora of words used in a first sense;
   obtaining a second corpora of words used in a second sense;
   generating, by a processor, a first set of patterns and a second set of patterns using said first corpora of words and said second corpora of words, respectively;
   receiving a question passage;
   examining, by said processor, a word of interest in said question passage; and
   notifying, by said processor, a user that said word of interest is being used in said first sense or said second sense in response to identifying said word of interest in only said first set of patterns or said second set of patterns, respectively.

2. The method as recited in claim 1, wherein said first and second sets of patterns are generated using an iteratively supervised lexicon induction algorithm.

3. The method as recited in claim 1 further comprising:
searching and identifying in said first and second sets of patterns for matching patterns; and
removing matching patterns from said first and second sets of patterns.

4. The method as recited in claim 1 further comprising:
notifying said user cannot conclude sense of usage of said word of interest in response to not identifying said word of interest in either said first set of patterns or said second set of patterns.

5. The method as recited in claim 1, wherein said first corpora of words is associated with a first linguistic domain and said second corpora of words is associated with a second linguistic domain.

6. The method as recited in claim 1 further comprising:
identifying said word of interest in both said first and second sets of patterns;
comparing said question passage to patterns in said first and second sets of patterns containing said word of interest;
generating scores for each pattern in said first and second sets of patterns containing said word of interest based on similarity of said question passage to each pattern in said first and second sets of patterns containing said word of interest;
identifying a pattern in said first and second sets of patterns containing said word of interest attributed with a highest score; and
notifying said user that said word of interest is being used in said first sense in response to said pattern attributed with said highest value in said first and second sets of patterns being associated with said first corpora of words and said highest value exceeding a threshold value or notifying said user that said word of interest is being used in said second sense in response to said pattern attributed with said highest value in said first and second sets of patterns being associated with said second corpora of words and said highest value exceeding said threshold value.

7. A computer program product for disambiguating meaning of terms, the computer program product comprising a computer readable storage medium having program code embodied therewith, the program code comprising the programming instructions for:
obtaining a first corpora of words used in a first sense;
obtaining a second corpora of words used in a second sense;
generating a first set of patterns and a second set of patterns using said first corpora of words and said second corpora of words, respectively;
receiving a question passage;
examining a word of interest in said question passage; and
notifying a user that said word of interest is being used in said first sense or said second sense in response to identifying said word of interest in only said first set of patterns or said second set of patterns, respectively.

8. The computer program product as recited in claim 7, wherein said first and second sets of patterns are generated using an iteratively supervised lexicon induction algorithm.

9. The computer program product as recited in claim 7, wherein the program code further comprises the programming instructions for:
searching and identifying in said first and second sets of patterns for matching patterns; and
removing matching patterns from said first and second sets of patterns.

10. The computer program product as recited in claim 7, wherein the program code further comprises the programming instructions for:
notifying said user cannot conclude sense of usage of said word of interest in response to not identifying said word of interest in either said first set of patterns or said second set of patterns.

11. The computer program product as recited in claim 7, wherein said first corpora of words is associated with a first linguistic domain and said second corpora of words is associated with a second linguistic domain.

12. The computer program product as recited in claim 7, wherein the program code further comprises the programming instructions for:
identifying said word of interest in both said first and second sets of patterns;
comparing said question passage to patterns in said first and second sets of patterns containing said word of interest;
generating scores for each pattern in said first and second sets of patterns containing said word of interest based on similarity of said question passage to each pattern in said first and second sets of patterns containing said word of interest;
identifying a pattern in said first and second sets of patterns containing said word of interest attributed with a highest score; and
notifying said user that said word of interest is being used in said first sense in response to said pattern attributed with said highest value in said first and second sets of patterns being associated with said first corpora of words and said highest value exceeding a threshold value or notifying said user that said word of interest is being used in said second sense in response to said pattern attributed with said highest value in said first and second sets of patterns being associated with said second corpora of words and said highest value exceeding said threshold value.

13. A system, comprising:
a memory unit for storing a computer program for disambiguating meaning of terms; and
a processor coupled to the memory unit, wherein the processor is configured to execute the program instructions of the computer program comprising:
obtaining a first corpora of words used in a first sense;
obtaining a second corpora of words used in a second sense;
generating a first set of patterns and a second set of patterns using said first corpora of words and said second corpora of words, respectively;
receiving a question passage;
examining a word of interest in said question passage; and
notifying a user that said word of interest is being used in said first sense or said second sense in response to identifying said word of interest in only said first set of patterns or said second set of patterns, respectively.

14. The system as recited in claim 13, wherein said first and second sets of patterns are generated using an iteratively supervised lexicon induction algorithm.

15. The system as recited in claim 13, wherein the program instructions of the computer program further comprise:
searching and identifying in said first and second sets of patterns for matching patterns; and removing matching patterns from said first and second sets of patterns.

16. The system as recited in claim 13, wherein the program instructions of the computer program further comprise:

notifying said user cannot conclude sense of usage of said word of interest in response to not identifying said word of interest in either said first set of patterns or said second set of patterns.

17. The system as recited in claim 13, wherein said first corpora of words is associated with a first linguistic domain and said second corpora of words is associated with a second linguistic domain.

18. The system as recited in claim 13, wherein the program instructions of the computer program further comprise:

identifying said word of interest in both said first and second sets of patterns;

comparing said question passage to patterns in said first and second sets of patterns containing said word of interest;

generating scores for each pattern in said first and second sets of patterns containing said word of interest based on similarity of said question passage to each pattern in said first and second sets of patterns containing said word of interest;

identifying a pattern in said first and second sets of patterns containing said word of interest attributed with a highest score; and notifying said user that said word of interest is being used in said first sense in response to said pattern attributed with said highest value in said first and second sets of patterns being associated with said first corpora of words and said highest value exceeding a threshold value or notifying said user that said word of interest is being used in said second sense in response to said pattern attributed with said highest value in said first and second sets of patterns being associated with said second corpora of words and said highest value exceeding said threshold value.

\* \* \* \* \*